United States Patent [19]

Hirschfeld

[11] 4,219,759
[45] Aug. 26, 1980

[54] THREE PHASE POWER CONTROL UNIT

[76] Inventor: Richard L. Hirschfeld, 372 Bolinas Rd., Fairfax, Calif. 94930

[21] Appl. No.: 945,435

[22] Filed: Sep. 25, 1978

[51] Int. Cl.² ............................................. H03K 3/16
[52] U.S. Cl. ................................. 315/146; 315/314; 315/307
[58] Field of Search ............... 315/297, 182, 276, 307, 315/314, 137, 144, 146; 307/130; 323/43.5 S

[56] References Cited

U.S. PATENT DOCUMENTS

| 3,700,925 | 10/1972 | Wood | 323/43.5 S |
| 3,754,160 | 8/1973 | Jensen | 315/297 |

OTHER PUBLICATIONS

Lemelson, H. "Energy Conservation in an All Electric Building" Electrical Contruction and Maintenance 4/78, pp. 63-66.
Novak, W. "Saving Energy Through Load Scheduling, Cycling and Shedding," Electrical Construction and Maintenance, 4/78.
Widelite Corporation Bulletin on Automatic Energy Control System, copyright 1976.
Allen-Bradley, Product Data Bulletin 1820, Demand/Schedule Controller General Electric Product Bulletin on Maxi-Miser II, 4/78.

*Primary Examiner*—David N. Moore
*Attorney, Agent, or Firm*—Flehr, Hohbach, Test

[57] ABSTRACT

A three phase voltage controller for controlling the voltage applied to a three phase load. The controller includes three autotransformers which have a plurality of output taps for stepping down the output voltage. Contacts to the taps are selected for a high output voltage and a low output voltage with the contacts selected either manually or automatically. In the automatic mode, time delay is provided in switching from a high output voltage to a low output voltage, and a re-cycle timer is provided to re-cycle from a low voltage to the high voltage temporarily. Single phase control contactors are provided to remove voltage from one or more output lines for load shedding. Circuit breakers are provided for removing the controller and for directly applying the input line voltage to the output line.

21 Claims, 3 Drawing Figures

THREE PHASE POWER CONTROL UNIT

BACKGROUND OF THE INVENTION

This invention relates generally to apparatus for controlling electrical power consumption of voltage regulatable loads such as lighting loads in office buildings, industrial plants, schools and other like buildings. More particularly, the invention relates to voltage control apparatus for three phase power sources whereby power consumption can be regulated.

Energy conservation is a major concern today. One effective method of conserving energy is through regulation of power consumption whereby unnecessary power usage is eliminated. Prior art devices for regulating lighting loads, for example, are known which include transformers connected in either a bucking or boosting circuit configuration. Such transformers normally form a static condition without any dynamic control. The absence of dynamic control either makes is impossible to trigger fluorescent lamps or alternatively prevents normal operation of fluorescent lamps when the voltage level drops too low or rises too high. For these reasons, such transformers generally have not been employed to control fluorescent lamp circuits.

Prior art transformer devices which have controls such as variacs generally have not had adequate sensing circuits to provide for the desired control of power consumption and lighting loads.

Regulators for lighting loads have also employed solid state elements. Such solid state elements are generally phase controlled devices which have a number of undesirable characteristics. For example, they tend to cause a significant amount of radio frequency interference (RFI). Further, they are not generally useable with fluroescent lights without some special provision in the fluorescent ballasts and auxiliary controls. Additionally, there is generally no protection against voltage surges in the triac, the diac, or other solid state developments. This absence of protection frequently causes the solid state control element to be damaged upon the occurence of a burnout of the lamp.

Disclosed in co-pending application Ser. No. 839,748, filed Oct. 5, 1977 (filed by the present applicant) is a single phase power control unit which is particularly useful for lighting loads such as incandescent lamps and fluorescent lamps. The power control unit is located between the power source and the load, typically between the circuit breaker and the lamps in a single circuit. The power control unit functions to reduce the voltage delivered to the load and thereby reduce the power consumed by the load. Reductions in power up to 10% or more are possible without any significant loss in lighting usefulness. Savings up to 40% or more are possible when significant reductions in lighting output are acceptable. The unit includes means for controlling operations as a function of voltage levels, delay times, clock times, and external conditions. The unit can automatically reduce the output voltage level with means for directly applying the input voltage level if the output voltage level drops below a predetermined threshold. Additionally, the unit includes delay means for timing periods when the output voltage to the load is either maintained at a reduced level or maintained at a non-reduced level. For example, the output is maintained at reduced level for a majority of time except that periodically, the output voltage is returned to a high level for short periods of time. Each time the output is returned to a high level, any fluorescent load on the line can be switched on.

SUMMARY OF THE INVENTION

An object of the present invention is an improved electrical power control unit.

Another object of the invention is a voltage control unit for three phase voltages.

Yet another object of the invention is a three phase voltage control unit which is directly operable with the incoming three phase voltage line.

Another object of the invention is a three phase voltage control unit which can control a plurality of load circuits such as fluorescent lights.

Still another object of the invention is a three phase power control unit which can be operated either automatically or manually.

Briefly, in accordance with the present invention a voltage control unit includes first, second and third transformer means each having an input terminal and a plurality of output terminals. Means is provided for connecting one input voltage phase to one input terminal of each of the transformer means, and contact means associated with each of the transformer means selectively contacts an output terminal of each of the transformer means. Manual switch means is provided for manually selecting the contact means to obtain a desired output voltage, and automatic switch means is provided for automatically selecting the contact means to obtain a desired voltage. Bypass switch means can be provided for directly connecting the input voltage lines to the output voltage lines without any voltage reduction.

In accordance with one feature of the invention, timing means is provided for automatically switching between high and low output voltage levels, and recycle means is provided to reapply the high voltage level momentarily.

In accordance with another feature of the invention single phase control is provided for removing voltage from one or more phases or for controlling the power in these phases.

The invention and objects and features thereof will be more readily apparent from the following detailed description and appended claims when taken with the drawing.

DETAILED DESCRIPTION OF THE ILLUSTRATED EMBODIMENTS

Figure 1:
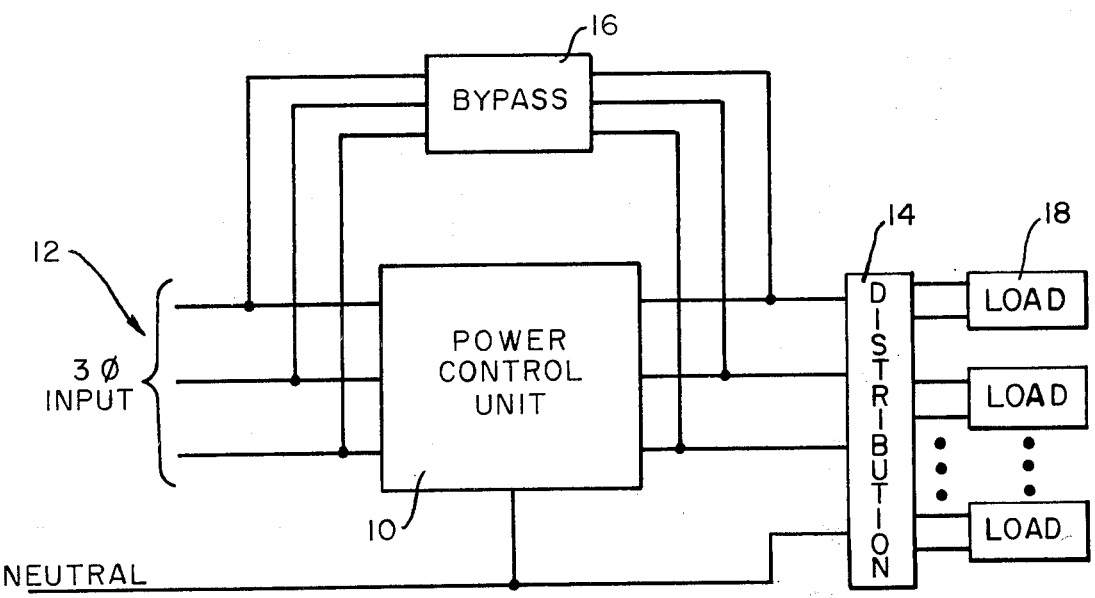
FIG. 1 is a functional block diagram illustrating a power control unit in accordance with the present invention for receiving three phase input line voltage and providing three phase controlled output voltage.

Referring now to the drawing, FIG. 1 is a block diagram illustrating a power control unit 10 in accordance with the present invention connected to receive three phase input line voltage shown generally at 12 and produce a controlled three phase output voltage to a distribution panel 14. The power control unit is preferably connected to the incoming line side of a three phase lighting panel board, for example, Bypass circuit means 16 is provided for the direct application of the three phase line voltage to the three phase output lines. The distribution panel 14 has a plurality of single phase load circuits 18 typically including fluorescent lights.

The control unit 10 preferably has a manual mode of operation, an automatic mode of operation, and an off or disconnected mode. In the latter mode bypass circuitry 16 may be utilized. The control unit can be operated to provide predetermined high or low voltage to the output lines with recycling means for recycling the high voltage momentarily for periodically turning on fluorescent lamps, for example.

Figure 2:
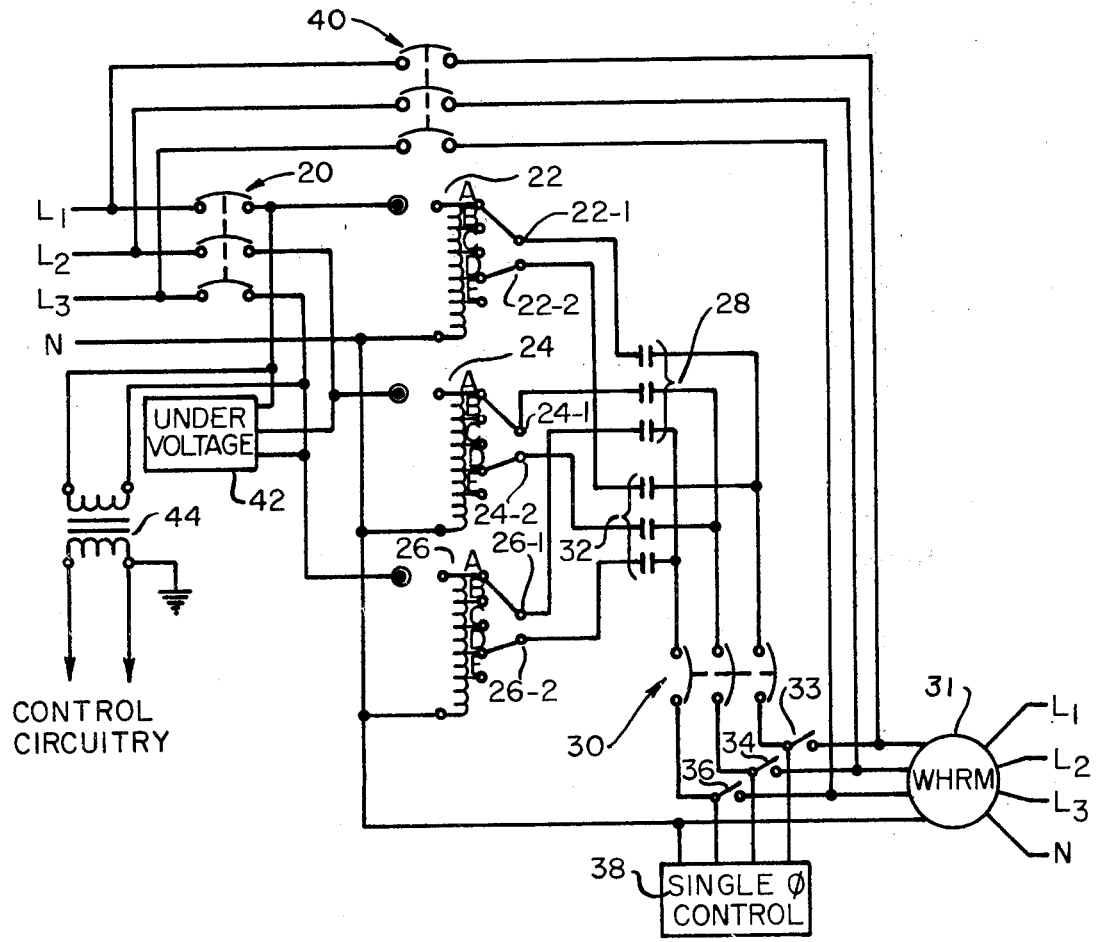
FIG. 2 is a schematic circuit diagram of one embodiment of a power control unit in accordance with the present invention.

FIG. 2 is a schematic diagram of one embodiment of a power control unit in accordance with the present invention. The input lines designated L1, L2, and L3 are connected through a three phase circuit breaker 20 to an input to autotransformers 22, 24 and 26, respectively. The neutral line, N, is also connected to one input of the auto transformers 22, 24, 26.

The output of each of the auto transformers includes a plurality of taps or contacts which are engaged by a pair of switches such as switches 22-1 and 22-2 for autotransformer 22. Similarly, switches 24-1 and 24-2 are provided for autotransformer 24, and switches 26-1 and 26-2 are provided for autotransformer 26. One set of switches for each transformer (e.g., 22-1, 24-1, and 26-1) are connected through a first three pole magnetic contactor 28 to a three pole circuit breaker 30. The other contacts of each of the autotransformers (e.g. 22-2, 24-2 amd 26-2) are connected through a second three pole magnetic contactor 32 to the three pole circuit breaker 30. For a 480 volts line to line input voltage, the tap settings of switches 22, 24, 26 provide line to line and line to neutral voltage output voltages, as follows:

| Tap | L-L | L-N |
|---|---|---|
| A | 480 v | 277 v |
| B | 456 v | 263 v |
| C | 433 v | 250 v |
| D | 408 v | 235 v |
| E | 384 v | 222 v |

The other side of three pole circuit breaker 30 is connected through a watt hour meter 31 to the three phase output lines. Thus, magnetic contactor 28 when closed applies a higher voltage to the output line than when magnetic contactor 32 is closed. As will be described with reference to FIG. 3, contactors 28 and 32 are closed alternately and not simultaneously.

Load shedding (e.g. phase control) circuitry is provided with single pole switches 33, 34 and 36 in each output line of circuit breaker 30. Relay timer and control circuitry 38 is provided whereby one or more phases of the output can be disconnected to shed load. Alternatively, single phase voltage control means such as disclosed in copending application Ser. No. 839,748, supra, can be provided in each line from breaker 30.

A bypass three pole circuit breaker 40 directly connects the three phase input lines to the three phase output lines whenever the control unit is disconnected. An under voltage unit 42 is connected to each of the three phase input lines to detect an incoming line under voltage condition whereupon the unit automatically recycles to line voltage output and remains there as long as the incoming line is below a safe operating voltage level.

Transformer 44 has its primary winding connected across two input lines with the secondary winding connected to provide reduced voltage for the control circuitry. Typically, the line to line input voltage will be on the order of 480 volts, and the control circuitry operates from 120 volts. Thus, transformer 44 steps down the voltage to the desired operating level for the control circuitry.

Figure 3:
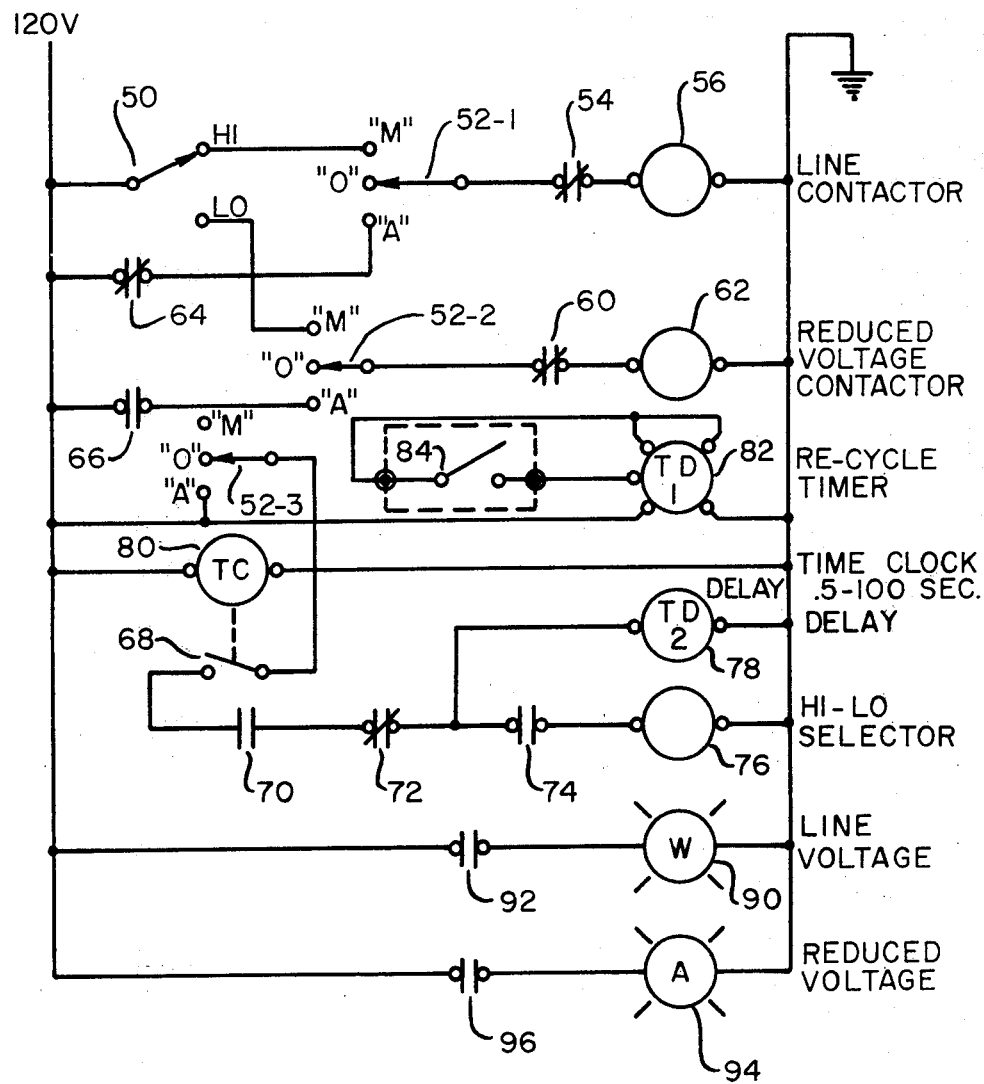
FIG. 3 is a functional schematic of the control portion of the power control unit of FIG. 2.

Referring now to FIG. 3, the controls for the switches and circuitry of FIG. 2 is illustrated. The circuitry is shown connected between the 120 volt output of transformer 44 of FIG. 2. Switch 50 is used in the manual mode to determine the high voltage output and low voltage output from the voltage control unit. Three pole, three throw switch 52 determines "manual", "off", or "automatic" operation through its contacts 52-1, 52-2, and 52-3.

The high output terminal of switch 50 is connected through the manual position of switch 52-1, contact 54, and relay 56 to circuit ground. The low voltage side of manual switch 50 is connected through the manual contact of switch 52-2, contact 60, and relay 62 to circuit ground. When current flows through relay 56, contact 60 is opened and magnetic contacts 28 in FIG. 2 are closed. Similarly, when current flows through relay 62 contact 54 is opened, and magnetic contacts 32 in FIG. 2 are closed. Thus, in the manual mode, switch 50 controls magnetic contacts 28 and 32 and determines whether a high voltage or low voltage is applied as an output.

When switch 52 is set for automatic mode of operation, a high voltage output is provided when current flows through contact 64, switch 52-1, contact 54, and relay 56. For a low voltage output in the automatic mode, current flows through contact 66, switch 52-2, contact 60, and relay 62. Contacts 64 and 66 are controlled by the same relay (to be described hereinbelow) whereby switch 64 is closed when the relay is de-energized and switch 66 is closed when the relay is energized.

Switch 52-3 connects to the 120 volt line only in the automatic mode and is serially connected with timer contact 68, under voltage contact 70, a first time delay contact 72, a second time delay contact 74 and high-low selector relay 76. Time delay relay 78 is connected between contacts 72 and 74 to circuit ground. Timer 80, which controls contact 68, is connected across the control line voltage.

In operation, with switch 52-3 in either the open or manual positions, the timer circuitry is inoperable since no voltage is applied thereto. When switch 52-3 is in the automatic mode, voltage is applied through the switch to contact 68. With timer 80 in a high voltage portion of the timing cycle switch 68 is open and the circuitry is inoperable. In this condition, switch 64 is closed and the high voltage magnetic contacts 28 are closed through energization of relay 56.

When timer 80 is in a low voltage period of a timing cycle, switch 68 is closed and current flows through contact 70 (assuming no line under voltage), closed contact 72, and through time delay relay 78. Time delay relay 78 is adjustable to provide a delay in switching the high voltage to a low voltage. After the set delay period, relay 78 closes contact 74 and thus energizes relay 76. Energization of relay 76 opens the high voltage contact 64 and closes the low voltage contact 66 thereby applying current through switch 52-2, contact 60, and relay 62. Current through contact 64 is interrupted by the energization of relay 76, and energization of relay 62 opens contact 54. Thus, the high voltage line contactor 28 is removed from the voltage control unit and the low voltage line contactor 32 is applied.

In the automatic mode of operation, the high voltage can be momentarily reapplied to the output line by means of a recycle timer 82 which operates in response to the closing of a single pole, momentary contact switch 84. Upon closing of switch 84, the timer 82 opens contact 72 for a set period time, thus interrupting current through relay 76 and consequently closing switch 64 and opening switch 66. The closing of switch 64 reapplies the high voltage to the output lines. After timer 82 is de-energized (depending on the time cycle thereof) contact 72 is again closed and low voltage relay 76 is energized after the period of delay determined by timer 78.

A line voltage indicating lamp 90 is serially connected with contact 92 across the control voltage line and indicates that high voltage is on the output by the closing of contact 92 in response to the energization of relay 56. A reduced voltage indicating lamp 94 is serially connected with contact 96 across the control voltage lines and is energized upon the closing of contact 96 in response to the energization of relay 62.

From the above description of a preferred embodiment, it is seen that the three phase control unit in accordance with the present invention allows either a manual or automatic mode of operation with bypass means for applying line voltage directly to the output lines. In the manual mode of operation either a high output voltage or low output voltage is obtained by the manual setting of a switch. In the automatic mode of operation a reduced voltage is obtained automatically by timer means with provision for appropriate time delay in switching from a high voltage level to a low voltage level. Additionally, recycle means is provided to momentarily reapply a high voltage level during the automatic mode of operation. Further, load shedding (phase control) is available by providing switches in each of the three phase output lines whereby one or more phases of the output can be de-energized. The control circuitry can be by-passed by appropriate circuit breaker means.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A three phase voltage control unit for automatically controlling power consumption by applying voltage from three phase voltage input lines to three phase voltage output lines in accordance with varying energy demands comprising,
   first, second and third transformer means each having at least one input terminal and a plurality of output terminals,
   means connecting said input voltage lines to input terminals of said transformer means,
   contact means associated with said transformer means for selectively contacting output terminals of said transformer means,
   manual switch means for manually selecting said contact means to obtain a desired output voltage,
   automatic switch means including sensing means for automatically selecting said contact means to obtain a desired output voltage in accordance with varying energy demands, and
   means connecting said contact means to said output voltage lines.

2. A three phase voltage control unit as defined by claim 1 wherein said first, second and third transformer means comprise first, second and third autotransformers.

3. A three phase voltage control unit for applying voltage from three phase voltage input lines to three phase voltage output lines comprising,
   first, second and third transformer means each having at least one input terminal and a plurality of output terminals,
   means connecting said input voltage lines to input terminals of said transformer means,
   contact means associated with said transformer means for selectively contacting output terminals of said transformer means,
   first switch means for selecting said contact means to obtain a desired output voltage,
   automatic switch means for automatically selecting said contact means to obtain a desired output voltage,
   means connecting said contact means to said output voltage line, and
   bypass switch means for directly connecting said input voltage lines to said output voltage lines.

4. A three phase voltage control unit as defined by claim 3 wherein said means connecting said input voltage lines includes an input circuit breaker, means connecting said contact means includes an output circuit breaker, and said bypass switch means comprises a bypass circuit breaker.

5. A three phase voltage control unit as defined by claim 4 wherein said bypass circuit breaker can be closed only when said input circuit breaker and said output circuit breaker are open.

6. A three phase voltage control unit as defined by claim 3 wherein said contact means includes first and second switches associated with each of said transformer means and which can contact a plurality of output terminals.

7. A three phase voltage control unit as defined by claim 6 wherein said contact means further includes first and second magnetic contactors and said first and second switches are alternately switchably connectable to said output voltage lines through said first and second magnetic contactors.

8. A three phase voltage control unit as defined by claim 1 wherein said automatic switch means includes timer means and means responsive to said timer means for controlling said contact means.

9. A three phase voltage control unit as defined by claim 8 wherein said automatic switch means further includes time delay means for delaying the automatic switching of said contact means from a high voltage to a lower voltage.

10. A three phase voltage control unit as defined by claim 9 wherein said time delay means provides an adjustable time delay from 0.5 second to 100 seconds.

11. A three phase voltage control unit as defined by claim 9 wherein said automatic switch means further includes recycle switch means for recycling said contact means to a high voltage and reinitiating said time delay means.

12. A three phase voltage control unit as defined by claim 8 and further including bypass switch means for directly connecting said input voltage lines to said output voltage lines.

13. A three phase voltage control unit as defined by claim 12 wherein said means connecting said input voltage lines includes an input circuit breaker, said means connecting said contact means includes an output circuit breaker, and said bypass switch means comprises a bypass circuit breaker.

14. A three phase voltage control unit as defined by claim 13 wherein said bypass circuit breaker can be closed only when said input circuit breaker and said output circuit breaker are open.

15. A three phase voltage control unit as defined by claim 14 wherein said first, second and third transformer means comprise first, second and third autotransformers.

16. A three phase voltage control unit as defined by claim 15 wherein said means connecting said contact means to said output voltage lines includes single phase control means for further controlling the voltage on at least one output line.

17. A three phase voltage control unit as defined by claim 16 wherein said three phase voltage output lines are connected to a lighting panel and a plurality of single phase fluorescent lighting loads are connected to said lighting panel.

18. A three phase voltage control unit as defined by claim 1 wherein said means connecting said contact means to said output voltage lines includes single phase control means for further controlling the voltage on at least one output line.

19. A three phase voltage control unit as defined by claim 1 wherein said three phase voltage output lines are connected to a lighting panel and a plurality of single phase fluorescent lighting loads are connected to said lighting panel.

20. A power control unit connectable to a three phase source of power to receive three phase input lines having respective input voltage levels and to automatically control power consumption in a voltage-regulatable load where said load includes one or more fluorescent lamps, comprising,
   first, second and third transformer means connected to said source for providing from said input voltage levels a number of different voltage levels including a higher-value voltage level capable of starting said fluorescent lamps and including one or more lower-value voltage levels for reduced power consumption in said load,
   manual switch means for manually selecting one of said voltage levels for connection to said load,
   controller means for automatically controlling said switch means to select one of said voltage levels below said input voltage level to reduce power to said load, said controller means including recycle means causing said switch means to select said higher-value one of said voltage levels whenever said input voltage level is below a predetermined level.

21. A power control unit as defined by claim 1 and further including single phase control means for controlling the voltage on one phase for load shedding.

* * * * *